(12) United States Patent
Hasson et al.

(10) Patent No.: US 7,480,894 B2
(45) Date of Patent: Jan. 20, 2009

(54) METHOD AND SYSTEM FOR RETAINING FORMAL DATA MODEL DESCRIPTIONS BETWEEN SERVER-SIDE AND BROWSER-SIDE JAVASCRIPT OBJECTS

(75) Inventors: Laurent D. Hasson, New York, NY (US); Jobi George, Somers, NY (US); John J. Ponzo, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 933 days.

(21) Appl. No.: 10/784,026

(22) Filed: Feb. 20, 2004

(65) Prior Publication Data

US 2005/0188353 A1  Aug. 25, 2005

(51) Int. Cl.
*G06F 9/44* (2006.01)
(52) U.S. Cl. ..................................................... 717/115
(58) Field of Classification Search ................ 717/103, 717/106, 108, 143, 136, 115; 709/202–203; 719/331; 707/103 R, 104.1; 715/717, 513; 725/135
See application file for complete search history.

(56) References Cited

U.S. PATENT DOCUMENTS

| | | | | |
|---|---|---|---|---|
| 5,572,625 | A * | 11/1996 | Raman et al. ............... | 704/260 |
| 6,772,413 | B2 * | 8/2004 | Kuznetsov .................. | 717/136 |
| 7,051,316 | B2 * | 5/2006 | Charisius et al. ............ | 717/103 |
| 7,162,697 | B2 * | 1/2007 | Markel ........................ | 715/717 |
| 7,231,644 | B2 * | 6/2007 | Kieffer ........................ | 719/331 |
| 2002/0147763 | A1 * | 10/2002 | Lee et al. .................... | 709/202 |

OTHER PUBLICATIONS

Jim Conallen, "Modeling Web Application Architectures with UML", Oct. 1999, ACM, vol. 42, No. 10, pp. 63-70.*
Chung et al, Modeling Web Applications Using Java and UML Related Technologies', Proceedings of the 36th HICSS'03, IEEE 2002 pp. 1-10.*

* cited by examiner

*Primary Examiner*—Tuan Anh Vu
(74) *Attorney, Agent, or Firm*—Michael J. Buchenhorner; Douglas W. Cameron (57) ABSTRACT

A server method for converting objects of a first type into objects of a second type, the method comprising: a) identifying one or more object classes of the first type; b) determining instance data based on the classes of the first type; c) introspecting each class of the first type; d) creating an artifact representing a software model; and e) generating one or more converters, each converter being based on the artifact and is configured for receiving the instance data and generating JavaScript code for recreating the instance from the classes as objects of the second type, for display on a browser.

12 Claims, 4 Drawing Sheets

METHOD AND SYSTEM FOR RETAINING FORMAL DATA MODEL DESCRIPTIONS BETWEEN SERVER-SIDE AND BROWSER-SIDE JAVASCRIPT OBJECTS

CROSS-REFERENCE TO RELATED APPLICATIONS

Not Applicable.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of information technology and more particularly relates to the field of objects used in client server operation.

BACKGROUND OF THE INVENTION

When creating rich user interfaces in web pages, using tools such as HTML (HyperText Markup Language), DHTML (Dynamic HyperText Markup Language), JavaScript and CSS (Cascading Style Sheets)(all zero footprint, core browser technologies), the developer needs to create data objects on a page beyond embedding strings inside HTML tags. Several methods have been used that can be classified in 2 areas: creating XML data islands, or creating complex nested Arrays in JavaScript.

Such solutions have problems. Although XML streams can benefit from a formal schema (expressed as an XSD), XML data islands are not equally supported in all browsers. Second, XML data islands generally require significantly more processing power than plain JavaScript data structures. Finally, XML streams are often verbose and create a large transmission overhead over the plain data, causing a bandwidth consumption problem. On the other hand, JavaScript data structures can be made much more compact, are easy to manipulate, and perform well. But JavaScript variables and Arrays suffer from a lack of formalism: typing information for instance is often lost because JavaScript is not typed.

More importantly, the models used to describe the server-side data are typically different from those used to describe the client-side data. Often, the models for the client-side data are created in an ad-hoc fashion, without real formality. The lack of symmetry between the server-side data models and the client-side data models in modern web applications is something that is quite particular to those types of applications, and something that you do not see in other application paradigms such as GUI (graphical user interface) applications built using the common Model View Controller pattern. This issue is often cited as a reason why web applications can become difficult to maintain over time, given their fundamentally unstructured approach to data modeling on the browser.

When creating rich and interactive Web pages, it is important to have data locally represented in some way in the browser. A popular solution has been to use XML Data Islands (which appeared first in Microsoft's Internet Explorer browser V5) to represent that data. The benefits are clear: the data is represented in a formal way that matches a given model (whether expressed as an XML Schema or not), and gives the code on the web page an infrastructure to access and modify that data. However, representing data in XML has a number of shortcomings:

XML streams are large compared to the data they contain, and so, they consume more bandwidth than necessary and cause Web pages to load more slowly; XML support sees varying degrees of quality of implementation and performance across a number of browsers and platforms; and most importantly, XML by definition offers a declarative programming model that causes a shift compared to the programming model used n server-side Java-based applications which is procedural.

SUMMARY OF THE INVENTION

Briefly, according to an embodiment of the invention, a programming model in a server creates one or more classes of a first type (such as Java) that are converted to a second type of class requiring less transmission overhead than the first type (such as Java Script) while preserving the data definitions of the first type of class and transmitting the one or more objects for the classes of the second type to a client for rendering of the resulting objects therein.

DETAILED DESCRIPTION

Figure 1:
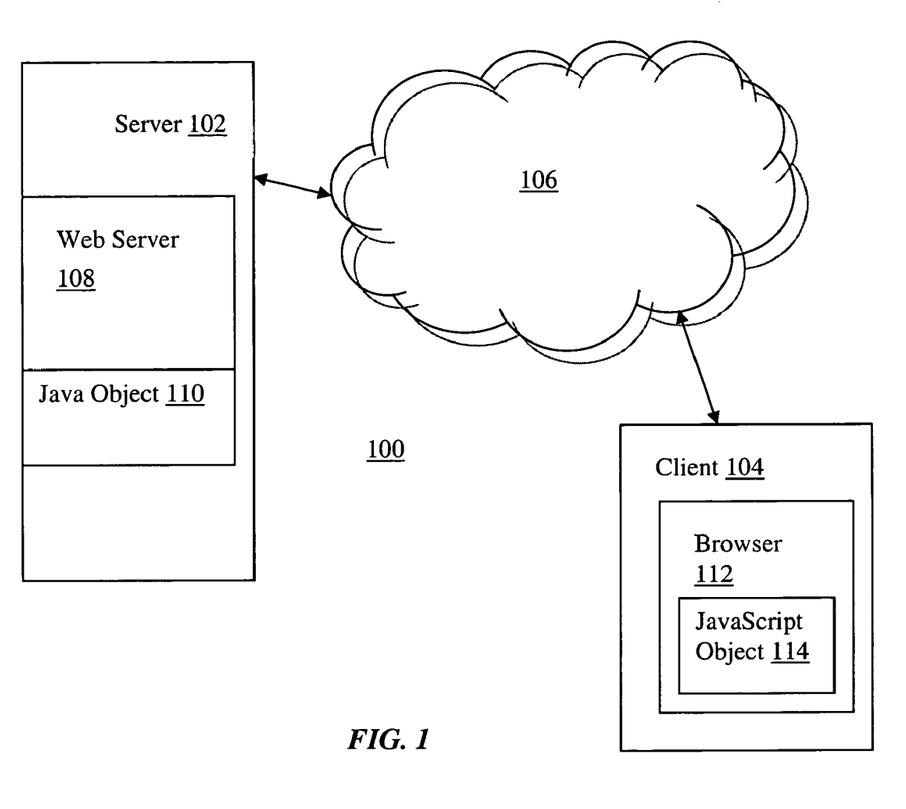
FIG. 1 is a simplified block diagram of a server coupled to a client via a network.

Referring to FIG. 1, there is shown a simplified version of a client-server network 100 illustrating an embodiment of the invention. A server 102 and a client 104 are coupled to each other via a network 106 (e.g., the Internet). The server 102 comprises a Web server 108 comprising one or more Java-based objects 110. The client 104 comprises a browser 112 comprising one or more JavaScript-based objects 114. Data on the browser 112 needs to be as formal as the data on the server 102 to enable truly rich applications. A similar programming model can be created for both the Java-based server and the JavaScript-based client. By extending the methodology used to describe server-side data (with UML specifications for instance), we can create data models and data sets in JavaScript that are based on the data models and data sets that exist on the server in Java. This invention describes a mechanism to do so, in an efficient manner, in a way as to be compatible with more browsers than XML-based solutions, while retaining formal modeling attributes.

The invention can be implemented as a server or a client. On the server 102, a developer can take a formal description of a data model and have JavaScript code generated on a Web page to be served. On the client side, a JavaScript-based framework can receive that code and on the fly generate an object model based on the specification, and data received.

Typically, a developer can use a tool such as IBM's Rational tools to create UML diagrams that describe the various data models used in a web application. Typically, those models apply to server-side Java objects. By using a technology based on the open source EMF project that is a part of Eclipse, we convert this specification into what we call an ECore file, which describes the model for the server-side data in a well known and well supported format. This embodiment allows the developer to create a projection mapping of that model (called an EMap) and generate code which, based on any Java object as input, can create a JavaScript fragment to be embedded on the page. On the browser-side a Java Script-based implementation of EMF (e.g., classes EClass, EAttribute, EReference, EObject) can receive that code and re-create in the browser a fully specified, and populated, object model. The developer can then write JavaScript code against this newly-created object in much in the same way he or she would do in a JavaScript environment. The browser side model is aware of typing, cardinality, univity, and reference information.

According to an embodiment, we describe a system (called the WDO4JS system). This is a mechanism used to transform a first kind of objects such as Java-based objects into a second kind such as JavaScript-based objects. We use a procedural interface in a way that retains the formal implementation on the server and projects it onto a browser in the client. The mechanism preferably makes use of the Eclipse Modeling Framework (EMF) to supply the artifacts necessary to model Java classes.

Figure 2:
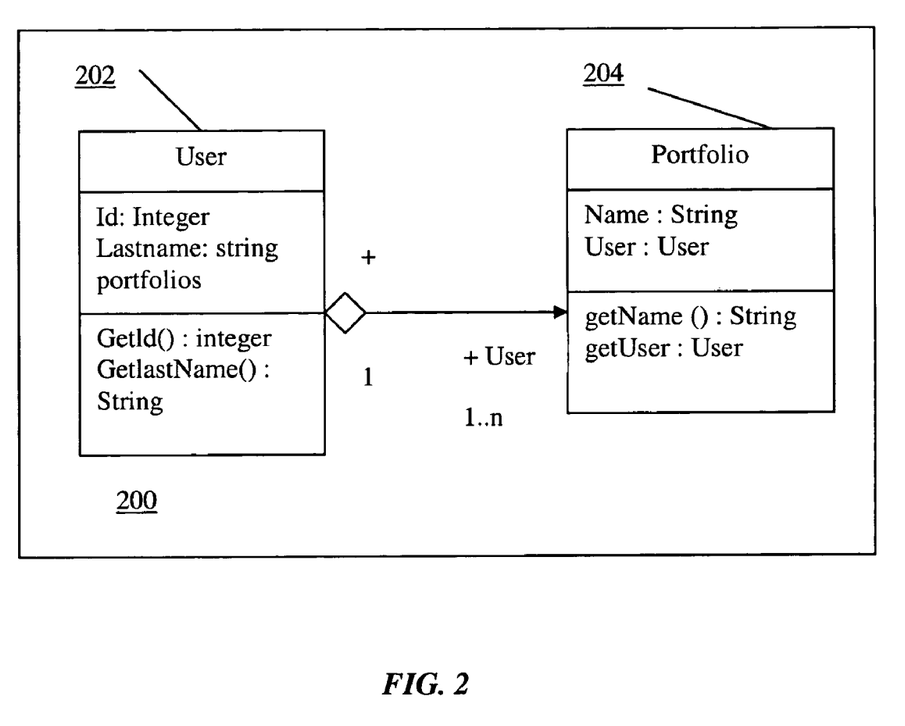
FIG. 2 is an illustration of the User and Portfolio objects according to an embodiment of the invention.

Referring to FIG. 2, there is shown a simple block diagram 200 illustrating the Java classes User 202 and Portfolio 204 and their relationships. As a supporting example, we will use the following two Java classes (only public methods, without body, are shown for brevity):

Using the UML notation, those classes can be visualized as follows: a User object has a unique identifier 'id' represented as an integer, a last name 'lastName', and a list of zero or more owned portfolios 'portfolios'. A Portfolio object has a name 'name', and a pointer back to the User 'user' which owns it.

A goal of the invention is to take any instance data based on such classes and transform them into JavaScript objects using EMF-derived APIs, and with rules as to enforce typing and various other modeling constraints that exist in the EMF/Java world, but not in JavaScript.

Preparing The Java Classes.

Given the Java classes (User and Portfolio) presented above, the system 100 needs to generate converters which, during the execution of the program on the server, can consume instance data for those classes and generate the JavaScript to re-create those objects on the browser.

Figure 3:
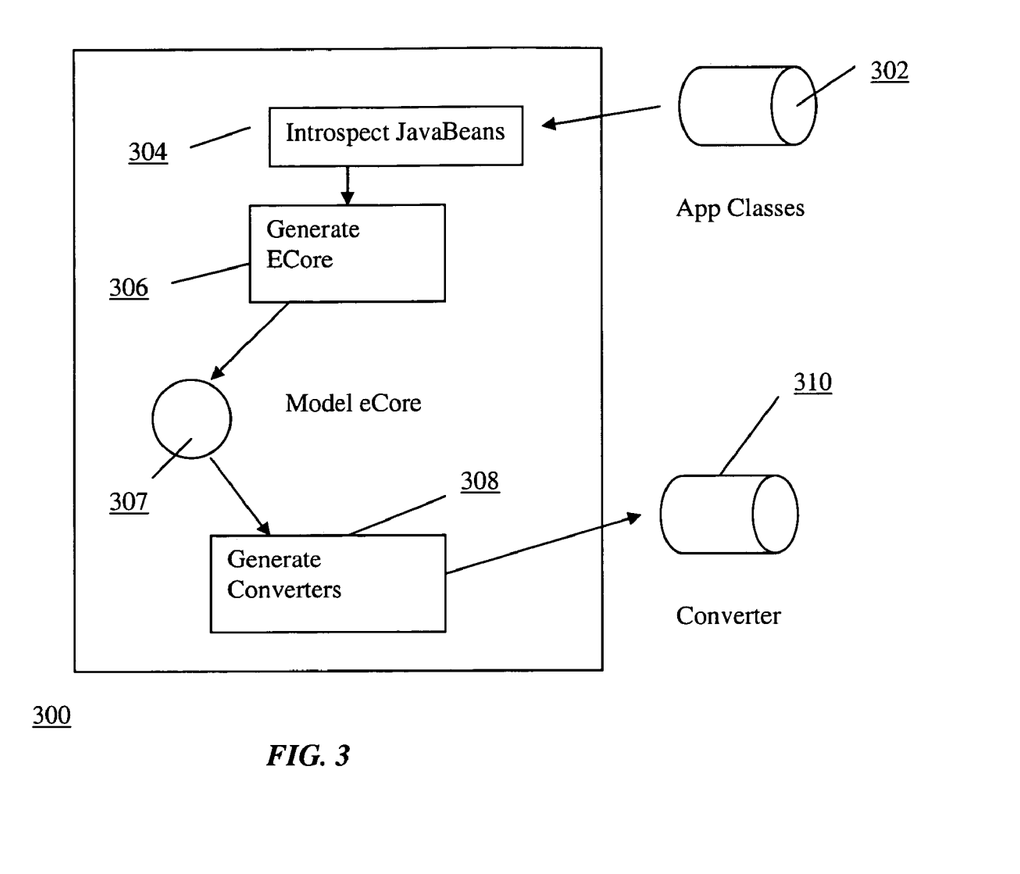
FIG. 3 is a high level block diagram showing a method of creating a converter according to the invention.

FIG. 3 is a high level block diagram showing a system and method of creating a converter according to the invention. An information processor system 300 receives one or more application classes (preferably JavaBeans) 302. In step 304, through a utility called WDO4JSGen, the system 300 introspects the classes 302 to figure out their structure and in step 306 it automatically generates an ECore model 307 for the classes 302. An ECore is the EMF artifact that represents a software model. Based on the ECore representation, in step 308, one or more converters 310 is/are created for each defined class. Those converters 310 can then be invoked at runtime to generate the JavaScript code necessary to re-create instance data from the application Java Beans 302 into objects in the browser 112.

In this process, an ECore model is preferably created as follows, to formally describe the Java classes. The ECore is shown below in XML form. It describes in that notation the contents of the software model we are using as an example.

```
public class User implements java.io.Serializable
{
    public User( );
    public User(int id, String lastName, Portfolio[ ] portfolios);
public int getId               ( );      public void setId          (int          v);
public String getLastName      ( );      public void setLast Name   (String       v);
public Portfolio[ ] getPortfolios ( );   public void setPortfolios  (Portfolio [ ] v);
}
public class Portfolio implements java.io.Serializable
{
public Portfolio ( )
public Portfolio (User user, String name)
public String getName   ( );        public void setName(String v);
public User getUser     ( );        public void setUser (User   v);
}
```

```
<?xml version=?1.0" encoding="ASCII"?>
<ecore:EPackage  xmi:version="2.0"
                 xmlns:xmi=http://www.omg.org/XMI
                 xmlns:xsi=http://www.w3.org/2001/SMLSchema-instance
                 xmlns:ecore=http://www.eclipse.org/emf/2002/Ecore
                 name="sample"
                 nsURI="parents.ecore"
                 nsPrefix="" ">
<eClassifiers xsi:type="ecore:EClass" name-"User"
    <eReferences
        name+"portfolios eType="#//Portfolio" upperBound="-1"
        containment="true" eOpposite="#//Portfolio/__U"/>
    <eAttributes
        name="id"
        eType="ecore:EDataType http://www.eclipse.org/emf/2002/Ecore#//EInt"/>
    <eAttributes
        name="lastName"
        eType="ecore:EDataType http://www.eclipse.org/emf/2002/Ecore#//EString"/>
    <eClassifiers>
    <eClassifiers xsi:type="ecore:EClass" name-"Portfolio";
        <eReferences
            name="user" eType="#//User" lowerBound="1" eOpposite="#//User/__Portfolios"/>
        <eAttributes
            name="name"
            eType="ecore:EDataType http://www.eclipse.org/emf/2002/Ecore#//EString"/>
</ecore:EPackage>
```

An EClassifier represents a Class in the software model. Here we have two: User and Portfolio. An EClassifier can have Attributes or References. An attribute is a property of a Class that can be represented using a simple value, for example, a name, or an id. A reference is a property of an object that is represented by a Class, for example, the "user" property for the Portfolio class.

The automatic process makes many assumptions that are fine for the default behavior. For instance, when encountering a property of a Java class that does not refer to an intrinsic type (including String), the cardinality (the number of values that can be held) is assumed to be zero or 1 (meaning that the property is in fact optional: it may or may not have a value assigned to it). If a property is represented by an Array or a list, the cardinality is assumed to be unbounded (zero or more elements). For tighter semantics, for example, a mandatory attribute or a list that can only contain up to five items, the ECore can be modified to provide those richer semantics, and the process can be customized to enforce them.

The other artifacts generated by the system are Converters, one for each class. The converters, together, form a compiled recursive descent parser, which will walk through the Java beans at runtime, and generate JavaScript code. Cycles and object aliasing must be handled properly. Converters follow the following algorithm:

```
for each property in a Class
    {
    if the property is an attribute
        {
        output the JavaScript code the value of that attribute
        }
    else if the property is a reference
        {
        create a buffer to hold the exported object value(s)
        if the property is an array
            {
            create an array to hold the object IDs for the
                referenced objects
            for each object in the array
                {
```

-continued

```
                compute the object's signature
                check the Map for the signature
                if the object is already in the map
                    {
                    get its export ID
                    add the ID to the array
                    }
                else
                    {
                    generate an Export ID
                    output the JavaScript code to declare the object
                    call the converter for the object
                    add the ID to the array
                    }
                }
            output a JavaScript array to hold the exported IDs
        }
        else
        }
            compute the signature of the object
            check the Map for the signature
            if the object is already in the map
            get its export ID
            else
            call the converter for the object;
        }
        output the buffer for the exported object values
}
```

This algorithm solves a number of issues when outputting the JavaScript code.

1. Because JavaScript is a linear language (an object cannot be used before it has been defined), it is important that objects are exported before they are referenced. So, for instance, when exporting a User object, you must first export the Portfolio objects.

2. As we see in the sample model, Portfolios do reference their owning User, so you have a reference cycle. For this reason, the algorithm separates the definition of the referenced object from its initialization. This allows us to break the reference cycle. For instance, assuming that our instance data consists of a User U1 and 2 Portfolios P1 and P2, we need to make sure the JavaScript code is output as follows:

define JavaScript variable for User "U1"

define JavaScri.pt variable for Portfolio "P1" initialize P1 with its name "P1", and its User "Ul" define JavaScript variable for Portfolio "P2" initialize P2 with its name "P2", and its User "Ui"

initialize U1 with an id, a last name, and the list [P1, P2] for the owned portfolios 3. It is also important to avoid defining or initializing an object twice. For this reason, each time an object is exported, we have to check a Map for a list of objects which have already been exported. A Map is a data structure that associate a unique string (a name, an id and so on) to an object, so that any object can be retrieved subsequently after supplying its name. Based on this Map, we can skip further initialization of objects which have already been output. It also avoids falling into infinite cycles due to reference cycles. For instance, without that check, the algorithm output the User first, then the Portfolios, but each portfolio also possesses a reference back to its owning User. So we would output the User again, and go to its list of Portfolios, and so on, ad infinitum.

4. An object's signature is by default represented by the collection of all its attributes, plus the signature of all its non-list references. The signature making code needs to be aware of reference cycles too, not only at the instance level but at the type level too (a file Folder has a parent Folder, and so the signature can be recursive at the type level). This can become large, and expensive to compute, and once again, the system can be customized to define more stringently the smallest number of properties of an object that together represent its uniqueness. The result is a String that is portable across any environment and represents the object's uniqueness.

<type-name>+{"<attribute_value>}*+<reference_signature>*

The Algorithm is as follows:

```
MakeSignature(Object Obj, StringBuffer Signature, boolean First)
{
        if (First == true)
        {
                Signature.append(Obj.getTypeName ( ) );
        }
        for each Attribute in the Object
        {
                if (Cardinality of attribute is "0 or 1"
                {
                        Signature; append (" ").append
                        (Obj.getProperty ( ));
                }
        for each Reference in the Object
        {
                if (Cardinality of reference is "0 or 1"
                {
                        MakeSignature(Obj.
                        getReferenceProperty ( ), Signature, false);
```

So, for instance, given the Portfolio with name="PI", and its User U1 with id=1% the signature is:

Portfolio' P1 '1

This has an important side effect in that if for some reason there are 2 physical copies of what is logically the same object, the system automatically aliases them out: in the browser, there will be only one copy of such duplicated objects.

This overall algorithm, except possibly for the Signature-creation part, is fairly common for similar systems that serialize object data graphs out. The implementation of this embodiment is just tailored to serialize those objects directly as JavaScript code, not an intermediary representation such as XML: JavaScript code can be made very compact, saving on bandwidth as the generated code is sent to a browser. Outputting JavaScript code directly also allows for better performance on the browser since the data is created directly using the JavaScript code, instead of being interpreted and parsed if it were in another text-based representation such as XML. The output directly targets the browser's own JavaScript interpreter.

Server Runtime

After all the converters have been generated, a developer can invoke them to generate a fragment of JavaScript code to be inserted in a page. Assuming that we have the following data set:

```
public static User CreateDataSet( )
    {
    User user = new User( );
    user.setId (1);
    user.setLastName("Doe");
    Portfolio[ ] portfolios = new Portfolio[2];
    portfolios[0] = new Portfolio(user, "portfolio 1");
    portfolios[1] = new Portfolio(user, "portfolio 2")
    user.setPortfolios (portfolios);
    return user;
    }
```

A user "Doe" has 2 portfolios: "portfolio 1 and "portfolio 2". Based on this data, the converters will generate the following blocks of JavaScript code. The first block declares the data model:

```
<SCRIPT>
// 1- Prologue
var A; var XTOTOX1=A; A=new ECreator ( ) .AddEAs;
var R; var XTOTOX2=R; R=new ECreator ( ).AddERs;
// 2- Root node
var WDO4JSModel_Patent=new EClass ("WD04JSMR_Patent")'
// 3- The User class
var UserClass=new EClass ("User", 1);
R (WD04JSModel_Patent, (["User", UserClass, o, -1, 0, 0, 0]]);
// 4- The Portfolio class
var PortfolioClass=new EClass ("Portolio",1);
R (WD04JSModel_Patent, (["Portfolio", PortfolioClass, 0, -1, 0, 0]]);
A (PortfolioClass, (["xmi:id", "id", 0]
                    ["name", "string", 0, 0, 1,1]]);
R (PortfolioClass, (["user", UserClass, 1,1,0,1 ]])
// 5- Finishing the User class
A (UserClass, (["xmi:id", "id", 0]
               ["id", "int", 0,0,1,1]
               ["lastName", "string", 0,0,1,0]])
R (UserClass, (["portfolios", PortfolioClass, 0, -1, 1,0]])
// 6- Creating the Model object
var (WD04JSModelRoot_Patent=new XMILoader
(WD04JSModel_Patent, 'User',
'com/ibm/odcb/test/jrender/patents/wdo4js/patent/patent_client.ecore');
// 7- Epilogue
A-XTOTOX1;
R=XTOTOX2;
</SCRIPT>
```

This code is structured as follows:
1. Start with some basic set-up to make the overall stream smaller. The code JavaScript class used to create a model is the ECreator class, and it has 2 methods, AddEAs( ) and AddERs( ) to add attributes and references respectively. If we had to call those methods all the time, the JavaScript code could be large. So we create aliases as "A" and "R" respectively for those methods (and be careful to make sure we do not overwrite variables of the same name which may have already been created before). More details will be provided about those methods in a following section.
2. Any model must have a root, and so we create the root to hold the classes we define.
3. The User class is declared, but not initialized. As we have seen before, you can have circular dependencies between classes. Here, User refers to Portfolio, and Portfolio refers to User, so if we happen to start with User, as is the case here, we have to separate the declaration of the class, which is independent from everything else, and it's initialization which depends on the Portfolio class. So here, we define the User class, and add it to the Root node of the model.
4. As we did for User, we then define the Portfolio class and add it to the root of the model. But since Portfolio does not depend on anything else but User, which has already been declared, we can go on initializing that class. It has a "name" attribute and a "user" reference. As you can see, an additional "xmi:id" attribute has been created. This is a reference attribute to easily identify any instance of any given object once we populate the model with instance data. It is used internally only by the browser framework.
5. Now we can get back to initializing the User class, with its "id" and "lastName" attributes, as well as its "portfolios" reference.
6. Now, all the classes and their relationships have been created, so we can finally create the main object to hold the model.
7. Finally, we reset the "A" and "R" variables we have borrowed at the beginning of the script block.

The second block of JavaScript generated by the Converters defines the data

Instance:

```
<SCRIPT>
// 1- Prologue
var C; var XTOTOX1=C; C=new EFactory( ).create;
var I; var XTOTOX2=I; I=new ECreator( ).Init;
// 2- Data initialization
var User2 = C(UserClass);
var. Portfolio3 = C(PortfolioClass);
I(Portfolio3, ["Portfolio3", "portfolio 0"], [User2]);
var Portfolio4 = C(PortfolicClass);
I (Portfolio4, ["Portfoiio4", "portfolio 1"], [User2]);
I(User2, ["User2",1, "Doe"], [[ Portfolio3,Portfolio4]]);
// 3- Data Graph creation
WDO4JSModelRoot_Patent.Root.eAdd('User', User2);
// 4- Epilogue
C=XTOTOX1;
I-=XTOTOX2;
</SCRIPT>
```

1. As with the previous block, we create a shorthand to call the methods that will create EObjects and initialize them
2. Following the same techniques as described for the first block of code, we create EObjects and initialize them separately in order to allow for circular references to exist, and the server-side code is smart enough to avoid infinite loops due to those circular references.
3. Next, we initialize the Model Object with the root of the EObject(s) created.
4. Finally, we reset the variables we used for the shorthands.

The interface to call the converters is very simple: just pass in the Java class instance you have, and the appropriate converter will automatically be invoked. The server-side Java code is as follows:

```
// 1- prologue
PageContext Ctx = new PageCantext( );
// 2- WDO4JS Emitter
WD04JSEmitter W = new WD04JSEmitter( ); W.Init(U, "Patent");
W.Export(out, Ctx);
```

The code is structured as follows:
1. The invention that is discussed herein is part of a larger framework. For the WDO4JS subsystem to work in this bigger context, it is dependent on a Context object which is created when a JSP page is created, and ends when the JSP page has finished rendering itself.
2. To export the Data, we simply create the emitter, a simple wrapper to hide the complexity of invoking the proper converters. Then it is initialized with the Data to be exported, and the name for the Model on the browser. Here, the Java variable "U" is the result of calling the method CreateDataSeto described earlier. Then finally, the Export method is called, passing to it the Context object, and a stream for exporting the JavaScript to. In JSPs, the stream is automatically created for the developer, and so can be used directly.

Browser Runtime

In JavaScript, we implemented several classes from the Eclipse Modeling Framework, which provides a generic infrastructure to describe data models and instance data. The following classes of EMF were implemented in JavaScript:
EFactory

```
function EFactory( )
{
    this.create = function(eclass);
}
```

This class is simple and creates an empty EObject based on an EClass.

Figure 4:
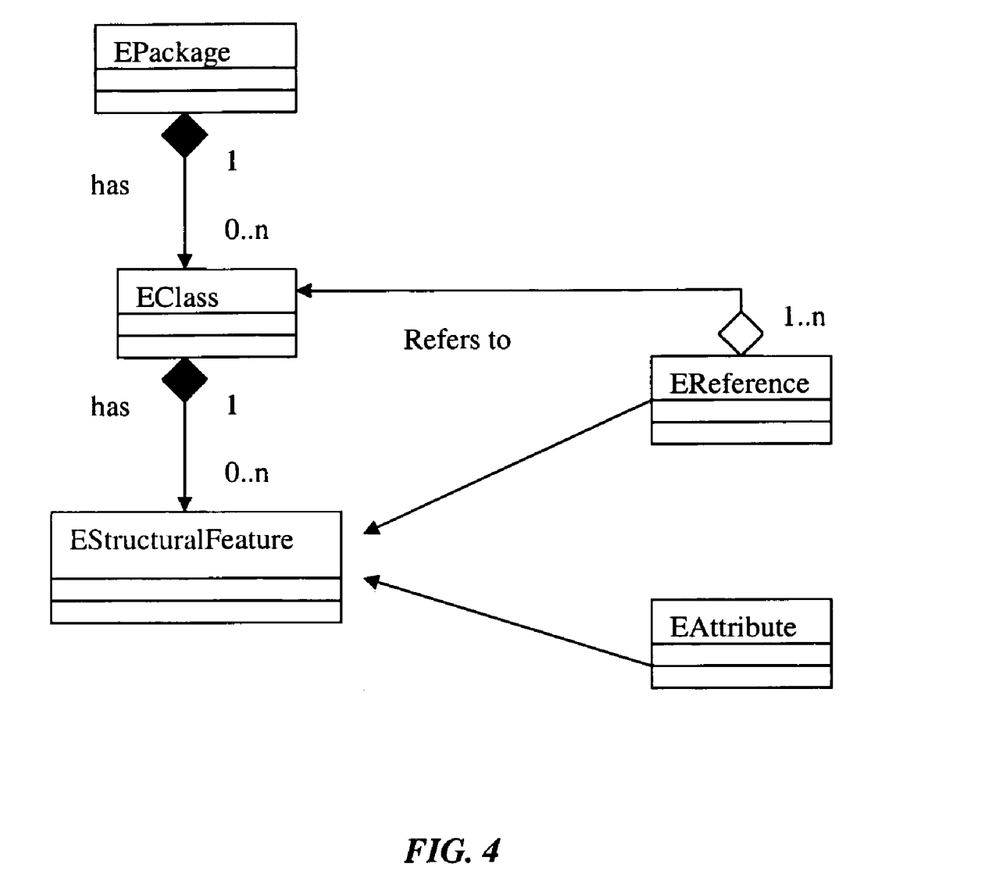
FIG. 4, there is shown a simple block diagram illustrating the relationship of the classes: EPackage, EClass, EStructuralFeature, EAttribute, and EReference.

EPackage, EClass, EStructuralFeature, EAttribute, and EReference.

Referring to FIG. 4, there is shown a simple block diagram illustrating the relationship of the classes: EPackage, EClass, EStructuralFeature, EAttribute, and EReference. Those classes directly map to their Java EMF counterparts. An EPackage resembles a Java package and contains EClasses, which are analogous to Java classes. An EClass is composed of EStructuralFeatures, which can either be EReferences of EAftributes, and which are analogous to Java class properties of either a Java complex type (User, Portfolio and the like), of a Java 'intrinsic' type (String, int, Integer, float, Float and the like).

```
function EPackage( )
{
  this.getEFactoryInstance  = function ( );
  this.setEFactoryInstance  = function (efactory);
  this.getEClassifiers      = function ( );
}
```

The EPackage allows you to get its EFactory and the list of EClasses it contains.

```
function EClass(name, diffgramNeeded)
{
  this.Name;
  this.getEPackage           = function ( );
  this.getEStructuralFeature = function (name);
  this.getEA11Attributes     = function ( );
  this.getEAllReferences     = function ( );
  this.Attributes.add        = function (attribute);
  this.Attributes.remove     = function (nameOrIndex);
  this.References.add        = function (reference);
  this.References.remove     = function (nameOrIndex);
}
```

An EClass has a name, belongs to an EPackage, and has a list of EStructuralFeatures, which is the union of all its EAttributes and EReferences. An EClass can be built by adding EAttributes and/or EReferences to it.

```
function EAttribute (name,type)
{
  this.CLASSTYPE =   "EAttribute";
  this.Name       ;
  this.Type       ;
  this.getLowerBound = function ( );
  this.setLowerBound = function (value);
  this.getUpperBound = function ( );
  this.setUpperBound = function (value);
  this.isID          = function ( );
  this.setID         = function (isID);
}
```

An EAttribute has a name and a type. Supported intrinsic types are:

"string"

"boolean"

"byte", "integer", "int", "long", "short", "decimal", "float", "double"

"unsignedByte", "positiveinteger", "nonNegativeinteger", "unsignedint", "unsignedLong", "unsignedShort", "nonPositiveinteger", "negativeInteger"

An EAttribute also has a cardinality, denoted by the lowerBound and upperBound properties, and a flag indicating whether the Attribute is to be considered as a token in the unique identity of the class it is contained in (part of the object's primary key, signature).

```
function EReference (name,eclass)
  this.CLASSTYPE = "EReference";
  this.Name
  this.getLowerBound         =   function( );
  this.setLowerBound         =   function (value);
  this.getUpoperBound        =   function ( );
  this.setUpperBound         =   function (value);
  this.isID                  =   function( );
  this.setID                 =   function (isID)
  this.isContainment         =   function( )
  this.setContainment        =   function(value)
  this.getEReferenceType     =   function(value)
}
```

An EReference has, like an EAttribute, a cardinality, and a flag indicating whether it is part of the ID of the object or not. It also includes a reference type (the type of the object referred to by this reference), and an flag indicating whether the referred object is owned or not (contained or not).

EObject

The EObject class is the class that represents the runtime artifacts of the objects created, based on the meta-data provided by the EClass information as described above. An EObject has properties that can be read or set.

```
function Object(eclass)
{
  this.EClass              = eclass;
  this-Clone               = function( );
  this.GetChildrenEObjects = function(deep);
  this.eGet                = function(name);
  this.eSet                = function(name.value);
  this.eAdd                = function(name.value);
  this.eRemove             = function(name.value);
  this.Sort                = function(propertyname,sortOrder);
  this.toStr               = function ( );
  this.getSignature        = function ( );
}
```

ELoader

```
function XMILoader(eclassroot, rootMemberName, ecoreNS)
{
    this.Root;
    this. EClass;
}
```

This class is simply a container for the instance data, which, once initialized, can be accessed through the "Root" property.

ECreator

The goal of the system is in part to create a performing way to re-create object systems from the server to the browser. For this, the most compact JavaScript should be used: it is smaller to transport, and faster to parse by the Browser engine. The ECreator class is a simple class that wraps the EClass and EObject APIs to make creating data models and data instances more compact.

```
function ECreator( )
{
   this.AddERs =      function(eclass, refParams)
   this.AddEAs =      function(eclass, attriParams)
   this.Init=function(eobject, attrValueArray, referenceArray)
}
```

A single API (AddERs) call can create one or more EReferences for an EClass, and a single API (AddEAs) call can create one or more EAttributes for an EClass. A single call as well can completely initialize an EObject with all its values for EAttributes and EReferences.

The Results

On the browser, you now have a fully formalized data structure which corresponds directly to what you had in the server. The system provides additional formalism that JavaScript does not support, such as typing. You can thus write JavaScript code as follows:

```
<SCRIPT>
var U = WD04JSModelRoot_Patent.Root.eGet('USer')[0];
document.write("<PRE>");
document.write("User: id="+U.eGet('id')+";
lastName+ "+U.eGet('lastName')+";/n");
varPorts + U.eGet ('portfolios');
for (var i = 0; i < Ports.length; ++i)
   {
     var P = Ports[i];
     document.write(" Portfolio: name="+P.eGet('name')+";\n");
   }
document.write(" </PRE>");
</SCRIPT>
```

The system even creates simpler bean-like APIs for the objects, taking advantage of JavaScript's dynamic type system. The code above could be re-written as:

```
<SCRIPT>
var U = WD04JSModelRoot_Patent.Root.getUser( ) [0];
document.write("<PRE>");
document.write("User: id="+U__getId ( )+";
lastName="+U.getLastName( )+";\n"); var Ports = U.getPortfolios( );
for (var i = 0; i < Ports.length; ++i)
   {
     var P = Ports[i];
     document.write(" Portfolio: name="+P.getName ( ) +";\n");
   }
document.write("</PRE>");
</SCRIPT>
```

If one tries to violate the constraints, such as the fact that a User's id is an integer, or that a Portfolio has only one owner, the system will produce an exception.

Therefore, while there has been described what is presently considered to be the preferred embodiment, it will understood by those skilled in the art that other modifications can be made within the spirit of the invention.

GLOSSARY

Converter: In this document, a generated piece of code responsible for projecting instances of a Java class (a Java object) to the JavaScript engine of the browser.

EMF: The Eclipse Modeling Framework is an open source project at http://www.eclipse.org/emf which pertains to create a standard set of APIs to represent any software models and associated instance data using a procedural interface.

ECore: An EMF term which describes the artifact that represents a software model.

Class: An Object Oriented software concept that represents a thing that exists in a software application, for example, a User, a Portfolio.

EClass: The EMF artifact that represents a Class.

EReference: The EMF artifact that represents a property of a class which points to another class.

EAttribute: The EMF artifact that represents a property of a class which contains simple values (such as a number or a string).

Java: A programming language for creating applications that run on all platforms without modification.

JavaScript: JavaScript is a scripting language that uses a syntax that is similar to that of Java, but it is not compiled into bytecode. It remains in source code embedded within an HTML document and must be translated a line at time into machine code by the JavaScript interpreter. JavaScript is supported by all popular Web browsers.

UML: The Unified Modeling Language, a standard notation to visually represent software models.

XML: Extensible markup language is an open standard for describing data in Web pages and business-to-business documents.

We claim:

1. A server method for converting Java-based objects into JavaScript-based objects, the method comprising:
   a) identifying one or more Java-based object classes;
   b) determining instance data based on the Java-based object classes;
   c) introspecting each Java-based object class;
   d) automatically creating an artifact representing a software model describing the instance data;
   e) generating at least one converter for each Java-based object, the at least one converter being based on the artifact and configured for receiving the instance data and generating JavaScript code for converting each Java-based object to a JavaScript object and for projecting the JavaScript objects on a browser web page;
   wherein the generating step comprises:
      maintaining rules that enforce typing and other modeling constraints not found in JavaScript; and
      defining a smallest number of properties of each of the JavaScript objects that together represent its uniqueness to produce a string that is portable across any environment and represents each JavaScript object's uniqueness, such that if there are two physical copies of what is logically the same JavaScript object, the method automatically aliases them out such that in the browser, there is only one copy of each duplicated JavaScript object;
   f) generating a simple wrapper for invoking the at least one converter.

2. The method of claim 1 wherein the object classes comprise JavaBeans and wherein the converters are invoked at runtime to generate JavaScript code required to recreate instance data from the JavaBeans into JavaScript objects in the browser.

3. The method of claim 2 wherein determining, for each property in a class, comprises determining whether the property is an attribute.

4. The method of claim 3 wherein invoking comprises outputting a JavaScript code for the value of the attribute.

5. The method of claim 3 further comprising wherein creating the artifact comprises creating a buffer to hold an exported object value or values if the property is an array.

6. The method of claim 5 further comprising creating an array to hold object IDs for the referenced objects for each object in the array.

7. The method of claim 6 further comprising computing a signature of the object if the object is in a map.

8. The method of claim 7 further comprising: calling an object; generating an export ID; outputting the JavaScript code to declare the object called as the converter for the object; and adding the ID to the array.

9. The method of claim 8 further comprising outputting a JavaScript array to hold the exported IDs.

10. The method of claim 8 farther comprising computing the signature of the object; checking the map for the signature; and if the object is already in the map; retrieving its export ID.

11. The method of claim 8 further comprising: calling the converter for the object; and outputting the buffer for the exported object values.

12. A computer readable medium comprising program instructions for:
   a) identifying one or more Java object classes from a web server;
   b) determining instance data based on the Java object classes;
   c) introspecting each Java object class;
   d) automatically creating an artifact representing a software model describing the instance data;
   e) generating at least one converter for each Java object, the at least one converter being based on the artifact and configured for receiving the instance data and generating JavaScript code for converting each Java-based object to a JavaScript object and for projecting the JavaScript objects on a browser web page;
   wherein the generating step comprises:
   maintaining rules that enforce typing and other modeling constraints not found in JavaScript; and
   defining a smallest number of properties of each of the JavaScript objects that together represent its uniqueness to produce a string that is portable across any environment and represents each JavaScript object's uniqueness, such that if there are two physical copies of what is logically the same JavaScript object, the method automatically aliases them out such that in the browser, there is only one copy of each duplicated JavaScript object;
   f) generating a simple wrapper for invoking the at least one converter.

* * * * *